June 15, 1948. R. L. WILSON 2,443,438
SYNCHRONIZING CONTROL APPARATUS FOR MULTIPLE ENGINES
Original Filed Oct. 12, 1943 4 Sheets-Sheet 1

Inventor:
Rosser L. Wilson
By Wallace and Cannon
Attorneys

June 15, 1948.  R. L. WILSON  2,443,438
SYNCHRONIZING CONTROL APPARATUS FOR MULTIPLE ENGINES
Original Filed Oct. 12, 1943  4 Sheets-Sheet 3

INVENTOR
ROSSER L. WILSON.
By Wallace and Cannon
ATTORNEYS

June 15, 1948.　　　　　R. L. WILSON　　　　　2,443,438
SYNCHRONIZING CONTROL APPARATUS FOR MULTIPLE ENGINES
Original Filed Oct. 12, 1943　　　　　　　　　　4 Sheets-Sheet 4

Inventor:
Rosser L. Wilson
By Wallace and Connor
Attorneys

Patented June 15, 1948

2,443,438

UNITED STATES PATENT OFFICE 2,443,438

SYNCHRONIZING CONTROL APPARATUS FOR MULTIPLE ENGINES

Rosser L. Wilson, Mahwah, N. J., assignor to American Brake Shoe Company, Wilmington, Del., a corporation of Delaware Original application October 12, 1943, Serial No. 505,938. Divided and this application September 15, 1947, Serial No. 774,081

4 Claims. (Cl. 60—97)

This application is a division of my co-pending application Serial No. 505,938, filed October 12, 1943.

This invention relates to control apparatus for use in governing the relative speeds of moving parts of machinery such as shafts and the like, and particularly it relates to such control apparatus for establishing and maintaining a substantially synchronous or other desired speed relationship between two or more such moving parts such as two or more rotating shafts which otherwise would operate independently of each other.

The need for control apparatus of the aforesaid character may arise in any situation where it is desirable that the variantly adjustable operating speed of a particular member, such as a shaft, serves as a standard with which the operating speed of one or more other independently driven shafts or the like is to be correlated. In such instances the shaft which is to constitute the standard may serve merely as a variable speed control shaft for one or more engines, motors or the like, or it may constitute the shaft of a master engine or motor of a group of two or more similar engines or motors which are to be operated in a correlated relationship.

The use of one or more engines as the driving power for an airplane affords one typical situation where control apparatus of the aforesaid character is desirable, for whether the airplane be driven by a single engine, or by two or more similar engines, the maintenance of the desired speed of operation such engine or engines is extremely difficult because of the rapid and extremely wide variance of the factors such as wind resistance, attitude of flight or the like, which affect and vary the operating speed of such engine or engines. Thus, in a single engine airplane, a variable speed electric motor may be used as a standard from which the speed of operation of the single engine may be automatically governed by control apparatus of the aforesaid character; while in an airplane having a plurality of engines, such control apparatus may serve to coordinate the speed of all of the engines with the speed of such a variable speed electric motor, or if desired, a particular one of the engines may serve as the variable standard of speed, and such control apparatus may serve to coordinate the speed of the other engines with the one engine which in such an event constitues the standard or master engine. It is therefore an object of this invention to enable automatic yet adjustable control of the speed of one or more engines to be attained in such a manner that control of the speed thereof is simplified, and if desired the control of the speed of all of the engines of a multi-motored airplane may be adjusted through manipulation of but a single control means.

Where such control apparatus is used as aforesaid to control the operating speed of one or more airplane engines, it is of course desirable that the apparatus be rugged in character, relatively light in weight, and dependable and accurate in its operation or correlation of the secondary shafts or engines with the master shaft, and in the patent to Wilson No. 2,232,753, patented February 25, 1941, several forms of control apparatus are disclosed which meet these fundamental requirements. It is, however, an important object of this invention to enable further improvement of the operating characteristics of such control apparatus to be attained.

Control apparatus of the aforesaid character attains the desired speed correlation through the control of power operated speed adjusting mechanism which, upon detection of undesired speed variance, acts to adjust the speed of the secondary shaft or the like in such a sense as to tend to re-establish the desired speed relationship. As a practical matter, the power operated speed adjusting means may be arranged to attain the speed adjustment in different ways which are determined to a great extent by the field in which the apparatus is used. For example, in an airplane engine, the speed may be varied by adjustment of the pitch of the propeller driven thereby, or by adjustment of the fuel supply means such as a carburetor, or by adjustment of other means which affect engine speed. Where resort is had to the adjustment of the propeller pitch, the power means for operating the same may in many instances constitute a standardized part of the equipment to which the control apparatus as a whole must be related and adapted so as to attain the desired accuracy of speed correlation.

An important problem encountered in the use of control apparatus of the aforesaid character centers about the inherent conditions which make the engine or other shaft-driving means more responsive to correction in one direction than in the other, for it will be clear that because of the load or other resistance which is usually effective upon a driven member or shaft, a reduction in the speed of the shaft may be effected more easily and quickly than an increase of the shaft speed. It is therefore a further object of this invention to enable control apparatus of the aforesaid character to compensate for such differences in the responsiveness of the controlled mechanism to speed correction in opposite directions, thereby to further increase the accuracy of correlation attained by the apparatus.

While control apparatus of the kind to which this invention relates operates under normal service conditions to maintain the speeds of the compared members or shafts within the operating tolerance for which the apparatus is designed, it must be recognized that circumstances may arise where the speed difference is relatively great, and to enable such apparatus to establish or re-establish the desired speed relation under such conditions is a further object of this invention. When such a great speed differential is present it is usually quite important that the desired speed relationship be re-established as rapidly as possible, and to enable this to be accomplished in control apparatus which operates within a small tolerance is another important object of the invention. Further and related objects of the invention are to render the rate of correction of the speed of the master shaft dependent upon the magnitude of the existing speed differential, and to enable the rate of such correction to be varied in accordance with the direction in which the correction is to be applied.

Other and further objects of the present invention will be apparent from the following description and claims and are illustrated in the accompanying drawings which, by way of illustration, show preferred embodiments and the principle thereof and what is now considered to be the best mode of applying that principle. Other embodiments of the invention embodying the same or equivalent principle may be used and structural changes may be made as desired by those skilled in the art without departing from the present invention and the purview of the appended claims.

In the various embodiments of the invention chosen for disclosure herein the invention is particularly adapted for governing the speed of one or more engines of an airplane, but it will be recognized that these embodiments of the invention are of general utility, and may be effectively employed in any circumstance where correlation of the speeds of two or more rotating and independently driven shafts is desired. Thus in the embodiment of the invention illustrated in Fig. 1 of the drawings, a plurality of shafts 20M, 20—1, 20—2, 20—3 and 20—N are shown, and means are provided for correlating the speeds of these shafts so that one of the shafts, as the shaft 20M, constitutes the master shaft, and the other shafts 20—1, 20—2, 20—3 and 20—N are maintained at speeds which bear a predetermined relationship to the master shaft 20M. This predetermined relationship may, as in the present case, be a substantially synchronous relationship, or, by the use of gearing, any other desired speed relationship between two or more shafts or the like may be maintained.

Figure 1:
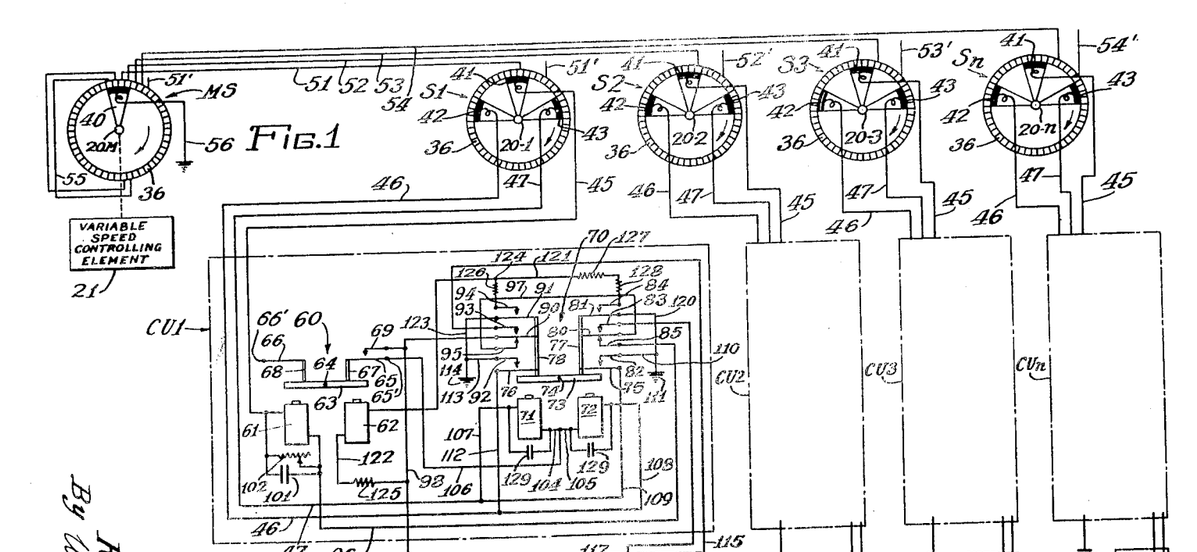
Fig. 1 is a schematic wiring diagram illustrating a control apparatus embodying the features of the invention and adapted for correlating the speed of one or more secondary shafts with the speed of a master shaft.

In the attainment of the desired speed relationship between the several shafts, the master shaft 20M is driven at the desired speed by driving means such as a variable speed controlling element 21 which may take any desired form such as a variable speed electric motor or a variable speed engine. Thus, as illustrated in Fig. 1 of the drawings, it is contemplated that the master shaft 20M will serve merely as a standard or master shaft with which the speeds of the other or secondary shafts 20—1, 20—2, 20—3 and 20—N are to be correlated, and hence the variable speed controlling element 21 may be in the form of a relatively small variable speed electric motor. The other or secondary shafts 20—1, 20—2, 20—3 and 20—N, may be driven by individual variable speed driving internal combustion engines such as the engine indicated at 22 in Fig. 1, which may take the form of an airplane engine operating through its main shaft 23 to drive a load 24 such as an airplane propeller. The drive from the engine shaft 23 to the related shaft 20—1 may, of course, be direct, or as in the present instance, may be attained through gearing 25. The speed of each such engine, and hence of the associated shaft as 20—1, may be varied by adjustment of the load or the propeller pitch, or by adjustment of the fuel supply means, and this may be accomplished by operation of conventional speed governing means such as the mechanism of a variable pitch propeller, or by operation or adjustment of the fuel pump or carburetor of the engine. Thus in Fig. 1 of the drawings such governing mechanism is indicated generally as 26, and it is by automatic operation or adjustment of such governing mechanism 26 that the desired correlation of the secondary shaft 20—1 with the master shaft 20M is attained under the present invention. The governing mechanism 26, of course, is adjustable in two directions so as to enable the speed of the secondary shaft 20—1 to be increased or decreased in accordance with the sense of the variance between the speeds of this shaft and the master shaft 20M, and such actuation may be effected in different ways, as, for example, by a reversible electric motor 27 having an operating connection 28 with the speed governing mechanism 27 and in Fig. 1 the speed adjusting means may be taken as being a fuel adjusting means and is therefore shown as being connected to the engine at 26'.

Figure 1A:
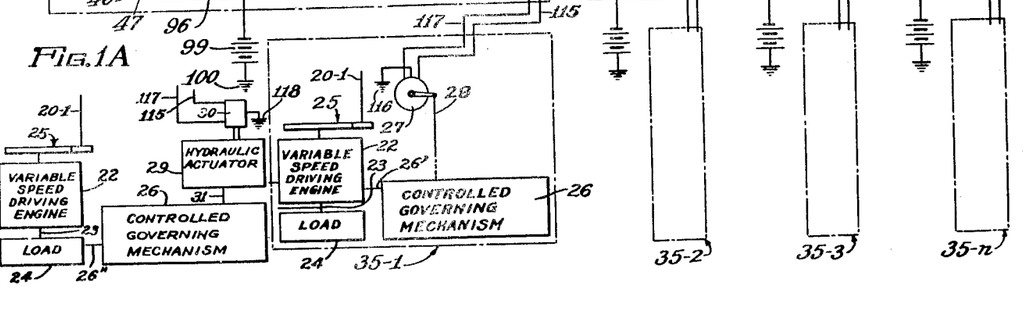
Fig. 1A is a fragmentary view of an alternative form of apparatus that may be utilized in place of a portion of the apparatus shown in Fig. 1.

It will be understood that the reversible electric motor 27 and the parts associated therewith are illustrative of an arrangement to which resort may be had for the effecting operation of the governing mechanism 26 and as a further example of means which may be employed for this purpose, resort may be had to the arrangement 5 shown in Fig. 1A wherein a two-way hydraulic actuator 29 is provided which is controlled by a two-way solenoid valve operator 30, the hydraulic actuator 29 being connected to the governing mechanism 26 through a connection as 31, and the governing mechanism 26 is in this instance associated 26″ with the load 24 so as to adjust the speed of the engine 22 by variation of the load, such adjustment of the load being attained by adjustment of the propeller pitch. Moreover, it will be evident that the electric motor 27 may be utilized for adjustment of the propeller or other load, or the hydraulic means 29 may be arranged in some instances so as to adjust a fuel supply means and thereby adjust the engine speed.

The mechanism which has thus been described for driving the secondary shaft 20—1, and for adjusting the speed at which the shaft 20—1 is driven, may be said to constitute a driving and speed adjusting unit 35—1 for the secondary shaft 20—1, the elements which make up such unit being clearly indicated in Fig. 1 by being included within a block defined by dot-dash lines and indicated by the reference character 35—1; and similar driving and speed adjusting units 35—2, 35—3, 35—N, similarly associated with the secondary shafts 20—2, 20—3, and 20—N, respectively, have been illustrated in Fig. 1 by blocks bearing such reference characters.

Under the present invention the speed of each secondary shaft as 20—1 is compared with the speed of the master shaft 20M to detect the presence and sense of any undesired variance between the speeds of the secondary shafts and the master shaft, and upon such detection of undesired speed variance in respect to a particular secondary shaft, the speed governing means of the associated engine is adjusted in a controlled manner in the direction required to re-establish the desired speed relationship. In accomplishing such adjustment an individual control unit CU1 is provided which governs the operation of the motor 27 of the unit 35—1; and similar control units CU2, CU3, and CU$n$ are similarly provided for and associated with the units 35—2, 35—3 and 35—N, respectively. Such control units CU1, CU2, and CU3 and CU$n$ are, in turn, associated with detecting means whereby the speeds of the respective secondary shafts are compared with the speed of the master shaft 20M, and such detecting means include a plurality of commutator switches MS, S1, S2, S3 and S$n$ associated respectively with the shafts 20M, 20—1, 20—2, 20—3 and 20—N. Each such commutator switch includes a circularly arranged series of commutator bars 36 and one or more brushes adapted for cooperation with such commutator bars 36. As shown in Fig. 1 the commutator bars 36 constitute the stationary parts of the switches, while the rotating parts of the switches are afforded by the brushes thereof, and hence the brushes of the respective commutator switches are arranged to be driven by the shafts with which their commutator switches are associated. Thus the master commutator MS has a single brush 40 driven by the shaft 20M, while the commutator switch S1 has three angularly spaced brushes 41, 42 and 43 driven as a unit from the secondary shaft 20—1. Each commutator switch S2, S3 and S$n$ is provided with similar brushes 41, 42 and 43 driven in each instance by the respective one of the secondary shafts with which the particular commutator switch is associated.

The three brushes 41, 42 and 43 of each secondary commutator switch, as S1, are associated with the related control unit, as CU1, by means including wires 45, 46 and 47 which are extended respectively from the brushes 41, 42 and 43 through conventional slip ring and plug connections and selected commutator segments of each secondary switch are so connected with different selected segments of the master commutator MS that when the speed of a secondary shaft varies so as to cause relative rotation to exist between that shaft and the master shaft 20M, circuits will be established to the wires 45, 46 and 47 in a sequence which depends upon the sense of such relative rotation and at a frequency dependent upon the magnitude of such relative rotation. In attaining this result the successive commutator bars 36 of the master commutator MS are allocated in succession to the respective secondary commutator switches and are electrically connected to correspondingly positioned commutator bars of the secondary commutator switch to which they are allocated. Where the master commutator switch is to be associated with four secondary commutator switches, as in the form shown in Fig. 1 of the drawings, the master commutator bars 36 may be considered as being divided into successive groups each including four commutator bars, and the connections for one such group are shown in detail in Fig. 1. Thus, the upper bar 36 just to the right of the vertical center line of the master commutator MS may be considered as the first one of such a group, and a wire 51 connects this bar to the correspondingly positioned commutator bar of the commutator switch S1. The second bar of such a group, that is next bar 36 of the master commutator MS, in a clockwise direction, is connected by a wire 52 to the correspondingly positioned bar of the commutator switch S2; while the third and fourth bars of the group are connected by wires 53 and 54 to corresponding commutator bars of the switches S3 and S$n$ respectively. In the present instance each annular series of commutator bars is so arranged that each bar 36 is electrically connected to the diametrically opposite commutator bar, as by wires 55, so that where each commutator contains but forty-eight bars, as in the present case, master commutator contains but six groups of bars of four bars each which must be connected in the manner hereinabove described. Thus, the first bar 36 of the next group has a wire 51′ extended therefrom to the corresponding segment of the switch S1; so that in the switch S1 three dead or unused commutator bars are disposed between those bars which are connected to the wires 41 and 51′. The other connections between the master commutator and the respective secondary commutators are made in the manner described so that, within 180° of the circumference of each secondary commutator, six equally spaced commutator segments are connected to correspondingly positioned bars of the master commutator.

Where diametrically opposite commutator bars are electrically interconnected as in the embodiment shown in Fig. 1, the brushes 41, 42 and 43 of each secondary commutator switch as S1 are arranged so as to lie entirely within 180° of the circumference of the commutator. This assures completion of the circuits to the wires 45, 46 and 47 in the desired manner, and avoids false indications of relative rotation or sense of such relative rotation.

To provide for such completion of electrical circuits through the respective brushes 41, 42 and 43 and the master brush 40, a ground connection 56 is provided from the master brush 40, and the wires 45, 46 and 47 from the respective secondary commutator switches are extended to the related control units as CUI. Since all of these control units in Fig. 1 are of similar construction, the specific description of such construction and of the relationship to the secondary commutator switches and to the controlled mechanism will be confined to the control unit CUI. Thus, the control unit CUI includes a pair of balanced relays 60 and 70, the relay 60 having a pair of actuating coils 61 and 62 adapted to act upon opposite ends of a balanced armature 63 which is centrally pivoted at 64 in symmetrical relation with respect to the two coils 61 and 62. The armature 63 is yieldingly urged toward the neutral position shown in Fig. 1, and this is accomplished in the present instance by a pair of normally aligned spring members 65 and 66 which are anchored at their remote ends at 65' and 66'. At its other end the spring member 65 acts through an insulating member 67 to urge the adjacent end of the armature 63 downwardly toward the actuating coil 62, while the other end of the spring member 66 acts in a similar manner through an insulating member 68 to urge the other end of the armature 63 downwardly toward the actuating coil 61. Thus the two opposed or balanced springs 65 and 66 tend to maintain the armature 63 in its neutral position as shown in Fig. 1.

In the present instance the spring member 65 serves also as a relay contact which is normally separated from an opposing contact 69, but when the relay coil 61 is energized, the armature is rocked in a counterclockwise direction so as to elevate the right hand end of the armature and thereby engage the contacts 65 and 69.

The other balanced relay 70 is of generally similar construction in that it has two actuating coils 71 and 72 arranged to act on opposite ends of an armature 73 which is centrally pivoted at 74. Similar springs 75 and 76 act through insulating members 77 and 78 respectively to urge the opposite ends of the armature 73 downwardly, thereby to impart the desired balanced characteristics to the armature 73. In the relay 70, however, a plurality of relay contacts are associated with each of the insulating members 77 and 78. Thus, on the right hand side of the relay 70 a switch pile is provided wherein the spring member 75 constitutes one of three movable switch or relay contacts of similar form. Thus two additional spring contacts 80 and 81 are associated with the insulating member 77 for upward actuation thereby when the armature is actuated in a counterclockwise direction. Stationary relay contacts 82, 83 and 84 of the spring type are disposed respectively above the movable contacts 75, 80 and 81 in normally spaced relation thereto, while a similar stationary relay contact 85 is disposed beneath the movable contact 80 in a normally engaged relation thereto, so that when the relay coil 71 is energized so as to raise the right hand end of the armature 73, the circuit through relay contacts 85 is opened, and circuits through the relay contact 82, 83 and 84 are closed.

On the left hand side of the relay 70 a similarly arranged switch pile is associated with the insulating member 78, to thereby provide movable contacts 90 and 91 connected to the insulating member 78. Stationary relay contacts 92, 93 and 94 of the spring type are disposed respectively above and in normally spaced relation to the movable relay contacts 76, 90 and 91, while a similar stationary relay contact 95 is disposed beneath and in normally engaged relation to the movable relay contact 90. Thus when the left hand end of the armature 73 is elevated due to energization of the actuating coil 72, the circuit through relay contact 95 is broken, and circuits are established through the relay contacts 92, 93 and 94.

The energizing circuit for the relay coil 61 is extended from the brush 41 of the related secondary commutator switch, as SI, by the wire 45 which is connected to one end of the coil 61, and this circuit is continued from the other end of the coil 61 by a wire 96 which extends to the relay contact 85. The relay contact 85 normally engages the contact 80 which is connected to the contact 95 by a wire 97; and thus the circuit is normally extended to the contact 90 which is connected by a wire 98 to one terminal of a source of electrical energy such as a battery 99. The other terminal of the battery 99 is grounded at 100, thereby to complete the energizing circuit for the relay coil 61.

The relay coil 61 of the present embodiment of the invention constitutes the master relay coil of the control unit, and for reasons which will become apparent as the description proceeds, this relay coil 61 is arranged to possess slow-to-release characteristics so as to remain energized, and normally maintain the relay contacts 65—69 closed, for a predetermined period after momentary energization of the relay coil 61. Such slow-to-release characteristics in the relay coil 61 may be attained in different ways, but as herein shown, a condenser 101 is connected across the terminals of the coil 61 to attain this result. Ordinarily, by selection of the proper value for the condenser 101, the desired normal release period may be attained within reasonable limits of accuracy, but to simplify attainment of the desired accuracy of the release period, an adjustable resistance 102 may be connected across the terminals of the coil 61 in parallel with the condenser 101.

The energizing circuits for the actuating coils 71 and 72 are arranged to include the relay contacts 65 and 69 so that neither of these two relay coils may be energized except during an operative period of the master relay coil 61 and to accomplish this, wires 104 and 105 are extended respectively from one terminal of each of the coils 71 and 72 to one end of a wire 106 which is connected at its other end to the relay contact 65. The other terminal of the relay coil 71 is connected to the wire 47 by a wire 107 while the other terminal of the relay coil 72 is connected to the wire 46 by a wire 108 thereby to afford circuits through which the relay coils 71 or 72 may be selectively energized during periods when the contacts 65—69 are closed.

When the relay coil 71 is thus energized, a holding circuit is established therefor, so as to thereafter render the coil 71 independent of the continued completion of a circuit through the brush 43, a wire 109 being extended from the wire 107 to the contact 75, and the contact 82 being connected by a wire 110 to ground at 111. Thus when energization of the relay coil 71 operates to raise the right hand end of the armature 73, the relay contacts 75 and 82 are engaged, and the desired holding circuit for the relay coil 71 is established. This holding circuit, of course, includes the relay contacts 65—69, so that the holding circuit is broken when the armature 63 of the relay 60 returns to its normal position. A similar holding circuit for the relay coil 72 is afforded by a wire 112 extended from the wire 46 to the relay contact 76 and a wire 113 extended from the relay contact 92 to ground at 114. Hence it will be clear that when the relay coil 71 or the relay coil 72 has been energized during the delay period of the relay coil 61, the establishment of the holding circuit for the one of the coils 71 or 72 which has been energized results in this particular coil remaining energized until the master relay contacts 65—69 are opened. It will be observed, of course, that during such period the other coil, as 71 or 72, may be energized, but this does not shift or return the armature 73 or change the condition or relationship of the contacts of the relay 70 so long as the holding circuit remains closed; and such energization cannot take place after the holding circuit of the previously energized coil of the relay 70 has been broken by separation of the contacts 65—69. Such functioning of the apparatus is due to the functional characteristics of the balanced relay 70, for it will be evident that where prior energization of one of the actuating coils has shifted one end of the armature 73 toward the energized coil, this energized coil will continue to exert an attractive force on the armature which will be substantially greater than the attractive force which could be exerted by the other coil in the event it were energized under such conditions.

The manner in which the relay coils of the control unit, as CU1, are energized is thus dependent to the relative positions of the secondary shaft and the master shaft as well as upon the sense and rate of any relative rotational movement which exists therebetween; and the selective positioning of the armature 73 in one actuated position or the other is indicative of the sense of relative rotation which exists between the master and secondary shaft. Hence the condition of the relay 70 is utilized to control the speed governing mechanism 26, and to this end the normally open contacts 83 and 93 of opposite sides of the relay 70 are placed in control of the actuating means such as the motor 27 or the solenoid 30 so as to govern the operation or adjustment of the speed control means in opposite directions. Of these two contacts, the contact 93 is closed when the sense of relative rotation of the shafts indicates that the speed of the secondary shaft is to be reduced, while the contact 83 is closed when the sense of relative rotation indicates that the speed of the secondary shaft is to be increased; and therefore the contact 83 is connected by a wire 117 to one terminal of that field winding of the reversible motor 27 which will drive the motor in such a direction as to increase the fuel supply to the engine 22, it being observed that the common terminal of the two field windings of the motor is grounded as at 116. Thus, closure of the contact 83, when the relay coil 71 is energized, completes a field circuit for the motor from ground at 100 through the battery 99, the wire 98, relay contacts 95 and 90, the wire 97, relay contacts 80 and 83, the wire 117, and through the proper one of the field coils of the motor 27 back to ground at 116. The circuit from the contact 93 to the other terminal of the other field winding of the motor 27 is afforded by a wire 115, so that when the relay contact 93 is engaged by the movable contact 90, an energizing circuit is established to the proper field winding of the motor to reduce the speed of the engine 22.

In the event that the speed governing means is hydraulically actuated, as by means of the hydraulic actuator or motor 29, the control valve thereof is shifted in opposite directions selectively by the two-way solenoid 30; and when such structure is to be used the common terminal of the solenoid 30 is grounded as at 118, and the other ends of the solenoid coils are connected respectively to the wires 117 and 115, as indicated by dotted lines in Fig. 1, so as to cause appropriate valve movement when the control circuits are selectively closed through the contact 83 or contact 93.

As an example of the operation of the structure thus far described it will be assumed that both the master shaft 20M and the secondary shaft 20—1 are rotating in a clockwise direction, as indicated by the arrows in Fig. 1, and that the speed of the secondary shaft 20—1 is slightly greater than that of the master shaft so that the sense of rotation of the secondary shaft is clockwise relative to the master shaft. For descriptive purposes, therefore, the master shaft may be considered as being stationary, with the brush 40 in the position shown, while the secondary shaft 20—1 and the connected brushes are rotating in a clockwise direction. Under such circumstances, the rotation of the brush assembly of the secondary commutator switch will establish a circuit from ground at 56 through the brush 40, the wire 51 and the commutator bars connected thereby, the brush 41, the wire 45, the relay coil 61, the wire 96, relay contacts 85 and 80, the wire 97, relay contacts 95 and 90, the wire 98, and through the battery 99 back to ground at 100. Thus the master relay coil 61 is energized and the armature 63 is rocked in a counterclockwise direction so as to close the relay contacts 65—69. Such energization of the master relay coil 61 continues until the aforesaid circuit is broken, as by the brush 41 passing in a clockwise direction past and out of contact with the commutator bar connected to the wire 51, for during this period of energization the condenser 101 is charged so as to maintain the coil 61 energized and the relay contacts 65—69 closed for the desired delay or release period. Thus during such delay period, the continued closure of the contacts 65—69 conditions the common circuit to the relay coils 71 and 72 so that these relay coils may be selectively energized by the cooperative action of the commutator switches MS and S1.

It may happen, of course, that the speed of relative rotation of the shafts 20M and 20—1 is so slow that the relay coil 61 will become ineffective and the relay contacts 65—69 will be opened prior to the closure of a circuit to one of the secondary relays 71 or 72. Such operation indicates that relative speed of the two shafts is within the allowable tolerance. However, if the speed of relative rotation of the two shafts exceeds such tolerance, and if it is of such a sense that the secondary shaft 20—1 is rotating in a clockwise direction relative to the master shaft 20M, the brush 42 of the secondary commutator will move into contact with the commutator bar which is connected to the wire 51 prior to the expiration of the release period of the master relay coil 61, and hence the circuit to the secondary relay coil 72 will be energized. This establishes a circuit through the contacts 90—93 and the wire 117 to that winding of the motor 27 which will operate the speed governing means 26 to reduce the speed of the engine 22.

In accordance with the present invention, the amount or extent of the corrective adjustment is varied and controlled in various was so as to attain unusual accuracy of correlation and unusual stability and the minimum fluctuation in the speed relationship of the two shafts. Thus, as one factor is attaining such controlled extent of the corrective adjustment, it will be clear that the length of the unexpired portion of the delay period of the master relay coil 61 at the time when the secondary relay coil, as 72, is energized constitutes a variable quantity which is in a general way a measure of the amount of corrective adjustment which is needed to re-establish the desired speed relationship. It has been pointed out, however, in the preceding discussion that in attaining speed correlation within a relatively small tolerance, in the order of one revolution per minute, the mechanism must be able to detect extremely small speed differences, and this requires that the release period of the master relay 61 be quite extended in most instances. Thus, under many circumstances the extended release period would tend to so extend the operative period of the adjusting motor 27 as to cause over-correction of the speed of the secondary shaft. Under the present invention, however, means are provided which enable a release period of the desired length to be employed for the master relay coil 61 without danger of objectionable over-correction. In the embodiment of the invention shown in Fig. 1 such means include the coil 62 of the balanced relay 60, and this coil 62 utilized as means for reducing the release time of the relay coil 61 whenever a control operation of the speed adjusting motor 27 is instituted. Thus, a normally long release period in the order of three or four seconds may be employed for the master relay coil 61, thereby to enable extremely small speed differences to be detected, and yet, this may be accomplished without causing an undue amount of corrective adjustment to be applied to the secondary shaft. Where the relay coil 62 is employed as a part of the means for accomplishing this result, circuits are provided for the relay coil 62 which are closed whenever one of the secondary relay coils 71 or 72 is operative to close the related relay contacts. Thus the relay contact 81 is connected by a wire 120 to ground at 111, and a wire 121 is extended from the relay contact 84 to one terminal of the relay coil 62. A wire 122 from the other terminal of the relay coil 62 is connected to the wire 98, thereby to extend circuit through the battery 99 and back to ground at 100. Hence when the relay coil 71 causes the contacts 81—84 to be closed, the relay 62 is energized. Similarly, the contact 91 is connected to ground at 114 by a wire 123, and the relay contact 94 is connected to the wire 121 by a wire 124, so that upon closure of the relay contacts 91—94, the relay coil 62 will also be energized.

When the relay coil 62 is thus energized, it attracts the right hand end of the armature 63 with a force which opposes the action of the coil 61 and augments the resilient forces which tend constantly to restore the armature to its neutral position, and hence as the energy of the condenser 101 is gradually dissipated through the coil 61, the combined action of the coil 62 and the resilient return forces acting on the armature 63 will restore the armature to its normal position more quickly than if the coil 62 were not energized. The effectiveness of the coil 62 is reducing the release time of the coil 61 is of course dependent upon the intensity with which coil 62 is energized. This intensity may be governed and matched with the characteristics of the relay coil 61 by means such as a resistance 125 included in the wire 122 so as to limit and reduce the current flow in the relay coil 62.

In accordance with the present invention the effectiveness of the relay coil 62 in reducing the release time of the master relay coil 61 is also governed differently in accordance with the direction of the corrective adjustment which is to be made, for by so doing, the effectiveness of the speed adjustments in different directions may be correlated despite the fact that the load on the secondary shaft tends to accelerate the corrective action when the speed of the secondary shaft is being reduced, and tends to retard the corrective action when the speed of the secondary shaft is being increased. Thus, the wire 124 includes another resistor 126, while the wire 121 includes resistance afforded for illustrative purposes by two resistors 127 and 128 in series, and the total resistive value of the resistors 127 and 128 is materially greater than the value of the resistor 126. Such resistors 127 and 128 therefore serve to reduce the current flow to the relay coil 62, below the value of the current which may flow through the circuit which includes the resistor 126, and hence when the corrective speed adjustment is to increase the speed of the secondary shaft, the relay coil 62 will be less effective and the period of corrective speed adjustment is greater than when the speed adjustment is to reduce the speed of the secondary shaft. In attaining such different reduction of the release period of the relay coil 61 in accordance with the direction in which the corrective adjustment is being made, a common resistance 125 has been shown in Fig. 1, resistances of different values have been shown in the branch leads to the relay contacts 84 and 94, but it will be recognized that in many instances the common resistance 125 and the resistor 126 might be eliminated and the desired differential in the release period of the relay coil 61 might in such a case be attained solely by resistance, as 127 or 128, in the circuit to the relay contact 84.

It will be observed that each of the relay coils 71 and 72 is illustrated as having an individual condenser 129 connected across its terminals, and in many instances such condensers may be of relatively small value or capacity so as to act merely to facilitate operation of such coils on current of a pulsating character. However, in most instances the condensers 129 are made of such a value as to impart at very slight slow-to-release period to the relay coils 71 and 72, for by so doing, the control apparatus may be caused to impart a relatively small corrective speed adjustment to the secondary shaft even through the detected speed difference is so slight that the energization of the coil 71 or 72 take place at substantially the end of the normal release period of the master relay coil 61.

Figures 2, 3:
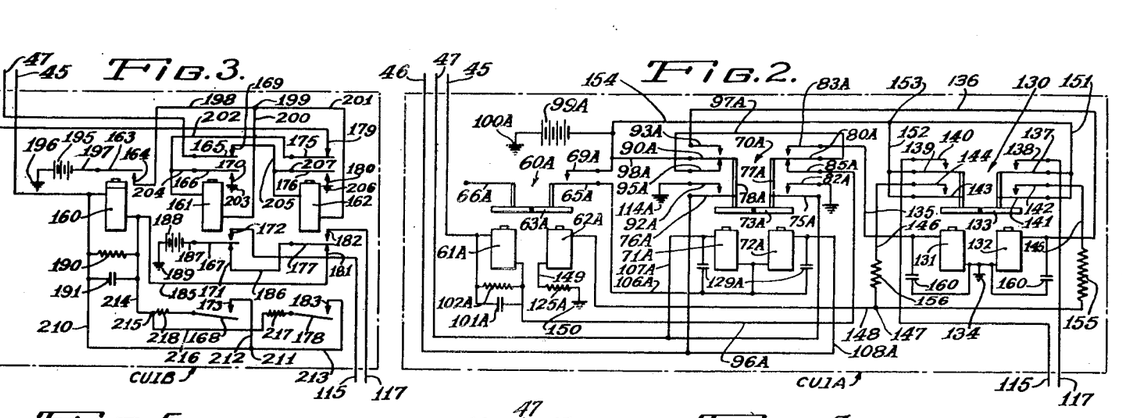
Fig. 2 is a wiring diagram illustrating another embodiment of control unit that may be utilized in the control apparatus of Fig. 1.
Fig. 3 is a wiring diagram illustrating still another control unit that may be utilized in the control apparatus of Fig. 1.

In Fig. 2 of the drawings the invention is illustrated as embodied in a control unit CU1A which under some conditions may be advantageously substituted for each of the control units illustrated in Fig. 1 so as to attain accurate correlation of the secondary shafts with the master shaft. The control unit CU1A is in many respects similar to the control unit CU1, but the control unit CU1A includes an additional balanced relay 130 which is associated with and controlled by the other two balanced relays. Those elements of the control unit CU1A which correspond in form and function to elements included in the control unit CU1 have been identified by corresponding reference numerals with the suffix "A" added in each instance. Thus the control unit CU1A includes a balanced relay 60A having actuating coils 61A and 62A arranged to operate upon opposite ends of a balanced armature 63A. One terminal of the relay coil 61A is connected to the wire 45 which may extend from one of the secondary commutator switches, as S1, and the circuit from the other terminal of the relay coil 61A is extended to the relay contact 85A by a wire 96A. It will be observed that the balanced relay 70A has fewer contacts than the balanced relay 70, for the contacts 81, 84, 91 and 94 are not included in the relay 70A, the functions of such omitted contacts being transferred in the present instance to the balanced relay 130. It will be observed that while the battery 99A is differently positioned in Fig. 2 than the corresponding battery 99 in Fig. 1, the connections to the relays 60A and 70A are in fact the same in Fig. 2.

The wires 46 and 47 shown in Fig. 2 may be extended from a secondary commutator switch in the manner illustrated in Fig. 1 and these wires are connected to the relay coils 71A and 72A in the same manner as in Fig. 1. Thus, when circuit is extended to the wire 45 by the commutator devices, the relay coil 61A is energized and the relay contacts 65A—69A are closed. The relay coil 61A has the resistance 102A and the condenser 101A connected across its terminals and therefore has slow-to-release characteristics, and hence the relay coil 61A remains effective after the energizing circuit thereto has been broken. In the event that the rate of relative rotation of the master and secondary shafts is sufficiently great, the circuit to the wire 46, or to the wire 47, will be completed prior to the expiration of the release period of the relay coil 61A, and the related secondary coil, as the coil 71A, will therefore be energized. In such an instance the right-hand end of the armature 73A would be elevated, thereby to establish a holding circuit for the relay coil 71A through contacts 75A—82A. This holding circuit includes the contacts 65A—69A so that the holding circuit will be broken when the armature 63A returns to its neutral position. Such actuation of the armature 73A also serves to separate the contact 80A from the contact 85A, thereby to break the circuit to the master relay 61A and make it impossible to again energize this relay coil until the armature 73A has returned to its neutral position.

When the relay contact 80A is thus elevated it is engaged with the contact 83A, thereby to extend circuit through a wire 135 to one terminal of the actuating coil 131 of the balanced relay 130. When the other one of the coils of the relay 70A is energized, the left-hand end of the armature 73A is elevated, and a holding circuit is established through the contacts 76A and 92A. At the same time the separation of the contact 90A from the contact 95A breaks the energizing circuit of the master relay coil 61A. The relay contact 90A is at this time engaged with the contact 93A which is connected by a wire 136 to one terminal of the actuating coil 132 of the balanced relay 130. The other terminals of the relay coils 131 and 132 are grounded at 134, and thus the operation of the balanced relay 70A in the control unit CU1A serves to govern the operation of the balanced relay 130, and this relay is, in turn, arranged to control the energizing circuit to a related adjusting unit, as 35—1 shown in Fig. 1. In accomplishing this result, the balanced relay 130 has a movable contact 137 arranged when the actuating coil 131 is energized to engage a stationary relay contact 138, and the relay contact 138 is connected to the wire 117 which extends to the related speed adjusting unit in the manner disclosed in Fig. 1. Similarly the balanced relay 130 has a movable contact 139 arranged to be actuated upwardly when the coil 132 is energized, and in such upward movement the contact 139 is engaged with a contact 140 which is connected with the control wire 115 in the manner disclosed in Fig. 1. Thus, as a result of the operation of the relay 70A, the actuating coils of the balanced relay 130 are selectively energized so as to cause circuit closure to the speed adjusting unit in the proper manner.

It will be recalled in the embodiment of the control unit shown in Fig. 1 of the drawings, the master relay coil was arranged to have a normal release time of considerable magnitude, thereby to impart initial sensitivity to the control apparatus, and provision was made for reduction of the release period of the master relay coil as an incident to the initiation of a control operation. Provision is also made in the control unit of Fig. 2 for the attainment of such operation, and for this purpose the balanced relay 130 has a movable relay contact 141 which is actuated, when the coil 131 thereof is energized so as to engage a stationary relay contact 142. On the other side of the relay 130 a stationary contact 143 is provided which is engaged with a contact 144 when the coil 132 of the relay 130 is energized. The two control switches which are thus afforded in the relay 130 are utilized to control and reduce the release time of the master relay 61A when the relay 130 is actuated. Thus a wire 145 is extended from the contact 142, and a wire 146 is extended from the contact 144 and these wires are joined at a terminal 147 from which a wire 148 is extended to one terminal of the relay coil 62A. A wire 149 extends from the other terminal of the relay coil 62A to ground at 150. Thus a circuit from ground at 150 and through the relay coil 62A has two branches to the two relay contacts 142 and 144, and this circuit may be completed selectively through the contacts 142 and 144 so as to extend circuit to and through the battery 99A and back to ground at 100A. For this purpose a wire 151 is extended from the contact 141, and a wire 152 is extended from the contact 143, these two wires being joined at a terminal 153 from which a wire 154 is extended to the ungrounded side of the battery 99A.

It will be recalled that the effectiveness of the relay coil 62A in reducing the release time of the relay coil 61A is governed by the amount of current which flows through the coil 62A when this coil is energized. Thus resistors 155 and 156 are included in the wires 145 and 146, respectively, to control current flow through the relay coil 62A. In order that the release time of the master relay 61A may be reduced in different amounts in accordance with the direction in which the corrective adjustment is being made. The resistance 155 is made somewhat larger than resistance 156, and hence when the relay coil 131 is energized so as to cause the speed adjusting apparatus to increase the speed of the secondary shaft, the circuit to the relay coil 62A will be through the contact 142 and the resistance 155 so that the coil 62A will be less effective to reduce the release time than if the circuit were through the relay contact 144 and the smaller resistance 156. Thus the operating period of the speed adjusting mechanism will be longer when the speed is being increased than it is when the speed of the secondary shaft is being reduced. In this connection it will be observed that the resistance 125 and the resistance 156 may in some instances be unnecessary, and the desired difference in the period of operation may be attained solely through the use of the resistance 155 in the wire 145.

The use of the balanced relay 130 in the control unit CU1A is advantageous in that it enables relatively large amounts of current to be drawn through the contacts 138 and 140 independently of the contacts of the balanced relay 70A, and hence the responsiveness of the relay 70A is maintained at a high level at all times. The use of the balanced relay 130 also enables other advantageous improvements to be attained in the operation of the control unit, for the relay coils 131 and 132 may have condensers 150 connected across their terminals so as to impart slow-to-release characteristics to these relay coils. Through the use of this arrangement the period of operation of the speed adjusting means may be extended to some extent beyond periods of closure of the contacts of relay 70A, and hence when the speed differential between the master and secondary shafts is relatively high, the extended operative periods of the relay coils 131 and 132 will bridge the gap between the operations of the relay 70A. This produces substantially continuous operation of the speed adjusting means when the speed differential is relatively high, thereby to restore the desired speed relationship quite rapidly. Such operation of the control unit CU1A is, however, attained in such a manner that the sensitivity of the control unit to relatively small speed differences is not objectionably changed or reduced. Thus it will be clear that where the slow-to-release characteristics of the coils of the relay 130 extend the operating periods of the speed adjusting means beyond the period of closure of the contacts of the relay 70A, the relay 70A and the master relay coil 61A will then be free and in proper condition to detect reversal of the direction of relative rotation of the two shafts. In the event that such reversal takes place, the master relay coil 61A will again be operated and the proper one of the relay coils of the relay 70A will also be operated. This will of course establish an energizing circuit to one of the actuating coils of the relay 130 which will tend to return the armature 133 to its neutral position. Hence the newly energized relay coil of the relay 130 will act to reduce the release time of the previously actuated one of these coils, and under most circumstances will operate the armature through its neutral position and into its other active position to thereby institute a speed adjusting operation in the opposite direction.

In Fig. 3 of the drawings a control unit CU1B is illustrated wherein the reduction in the normal release time of the master relay is attained through the use of a more conventional type of relay means. Thus the control unit CU1B has three relays 160, 161 and 162 arranged for association with a detecting means such as the commutator switch devices of Fig. 1, and adapted to control speed adjusting means in the same manner as the control unit CU1 of Fig. 1. The relay 160 has but one movable contact 163 which is arranged in a normally spaced relation to a stationary relay contact 164. The relay 161 has four movable contacts 165, 166, 167 and 168, and when the relay 161 is de-energized, the relay contact 165 is engaged with a stationary contact 169, the relay contact 166 is opposed to but separated from a stationary contact 170, the relay contact 167 is engaged with a stationary contact 171 and is in a position to be separated from the stationary contact 171 and engaged with a contact 172 when the relay 161 is energized, while the relay contact 168 is disposed in spaced but opposed relation to a stationary relay contact 173 when the relay 161 is energized.

The relay 162 has contacts of the same character and arrangement as the relay 161, there being four movable contacts 175, 176, 177 and 178. The relay contact 175 is arranged to normally engage a stationary relay contact 179, while the contact 176 is normally spaced from a stationary relay contact 180 so as to be engageable therewith when the relay 162 is energized. The contact 177 is disposed between stationary relay contacts 181 and 182 so as to normally engage the contact 181, while the relay contact 178 is disposed in normally spaced relation to a contact 183 so as to be engageable therewith when the relay 162 is energized.

In associating the control unit CU1B with a detecting means such as the commutator switches shown in Fig. 1, the wire 45 is connected to one terminal of the relay 160 which constitutes the master relay of the control unit CU1B, and circuit is extended from the other terminal of the relay 160 by a wire 185 to the relay contact 181 of the relay 162. This relay contact is at this time engaged with the contact 177 which is connected by a wire 186 to the contact 171 of the relay 161, so that circuit is thereby extended to the contact 167. A wire 187 connects the contact 167 to one side of an energy source such as a battery 188, and the other side of the battery 188 is grounded at 189 to thereby complete an energizing circuit for the master relay 160. The relay 160 has the desired slow-to-release characteristics imparted thereto by means such as a condenser 191 connected in parallel across the terminals of the relay, a resistance 190 being connected in parallel with the condenser 191, and hence the relay contacts 163—164 are maintained closed for a predetermined normal release period after the opening of the energizing circuit of the relay 160.

The energizing circuits for the relays 161 and 162 are arranged to include the contacts 163—164, thereby to render operation of such secondary relays dependent upon operation of the master relay 160. Thus a battery 195 has one terminal grounded as at 196 while the other terminal thereof is connected by a wire 197 to the relay contact 163, and the contact 164 has a wire 198 extended therefrom to a terminal 199. Branch lead wires 200 and 201 are extended from the terminal 199 to corresponding terminals of the relays 161 and 162 respectively. The other terminal of the relay 161 is connected by a wire 202 of the relay contact 175 of the relay 162, which normally engages the contact 179 to which the wire 46 is connected, so that when the detecting means, such as the commutator switches of Fig. 1, extends circuit from ground and through the wire 46 during the operating period of the master relay 160, the relay 161 is energized. When this occurs, a holding circuit for the relay 161 is established, the contact 170 being grounded at 203, and the contact 166 being connected to the wire 202 by a wire 204. This holding circuit extends from ground 203 through engaged contacts 170 and 166, the wires 204 and 202, the relay coil 161, wires 200 and 198, the contacts 164—163 and through the battery 195 to ground. Similar circuits are provided for energizing the relay 162, the wire 47 being connected to the contact 165 so as to extend circuit to contact 169 and thence through a wire 205 to the other side of the relay coil 162. The desired holding circuit is in this instance afforded by grounding the contact 180 at 206 and connecting the contact 176 to the wire 205 by a wire 207.

Thus, in the control unit CU1B the secondary relays 161 and 162 cannot be energized unless the circuit to a respective one of these two relays is completed through the wire 46 or the wire 47 at a time when the relay contacts 163—164 are closed, and when one of the relays 161 or 162 has been thus energized it not only completes its own holding circuit through the contact 166 or 176, but also, through opening of the contact 165 or 175, breaks the energizing circuit to the other one of the secondary relays so as to prevent operation of the other secondary relays during the time when the previously energized secondary relay remains operative. The master relay 160 is, of course, normally operated at least once in each relative rotation of the compared shafts, and if such relative rotation exceeds the allowable rate or tolerance, the circuit to one of the secondary relays will be completed prior to the expiration of the release period of the master relay. Thus, in accordance with the sense of the detected variance, the relay 161 or 162 will be operated, and when the relay 161 is operated the circuit from the battery 188 will be extended to the relay contact 172 which is connected to the wire 115 of a speed adjusting unit such as the unit 35—1 of Fig. 1. Similarly the relay contact 182 is connected to the wire 117 of the speed adjusting unit, so that when the relay 162 is energized, the speed adjusting unit will operate in the other direction.

In the control unit CU1B, as in the control unit CU1, the normal release time of the master relay may be made relatively long, thereby to attain high sensitivity to small differences of speed, and means is provided for reducing this normal release time of the master relay as an incident to the initiation of a control operation. In attaining this end wire 210 is extended from one terminal of the relay 160 to a terminal 211 from which branch leads 212 and 213 extend to the contacts 173 and 183 respectively. A wire 214 is extended from the other terminal of the relay 160 to a terminal 215, and a wire 216 which includes a resistor 217 is extended from this terminal to the relay contact 178. A resistor 218 is connected between the terminal 215 and the relay contact 168, and hence when the secondary relay 161 is operated, an alternative or shunt circuit, the effectiveness of which is controlled by the resistor 218, will be connected across the condenser 191 to thereby reduce the release time of the master relay 160. A conductor 216 leads from the terminal 215 to one end of a resistor 217, the other end of this resistor being connected to relay contact 178. Hence when relay 162 is energized an alternative or shunt circuit is connected across the condenser 191 and in this instance the effectiveness of this shunt circuit is controlled by the resistor 217. As in the case of the control unit CU1, it will be evident that in some instances it may be desirable to reduce the release time of the master relay in different amounts in accordance with the direction in which the corrective adjustment is to be made, and hence the resistance 218, which becomes effective when the speed of the secondary shaft is being reduced, is made somewhat smaller than the resistance 217, thereby to cause the release time of the master relay 160 to be reduced in greater amount when the speed of the secondary shaft is being reduced than when such speed is being increased. This result will be realized since the resistance 218, being smaller than the resistance 217, will enable the charge in the condenser 191 to be dissipated more rapidly than such charge will be dissipated when the resistance 217 is included in the shunt circuit about the condenser 191. Thus, while attaining great sensitivity to small speed differences, the control unit CU1B is operable to apply corrective adjustment to the secondary shaft without objectionable over-correction, and hence the relative speed of the compared shafts may be maintained within an extremely small tolerance through the use of the control unit CU1B.

Figures 4, 5:
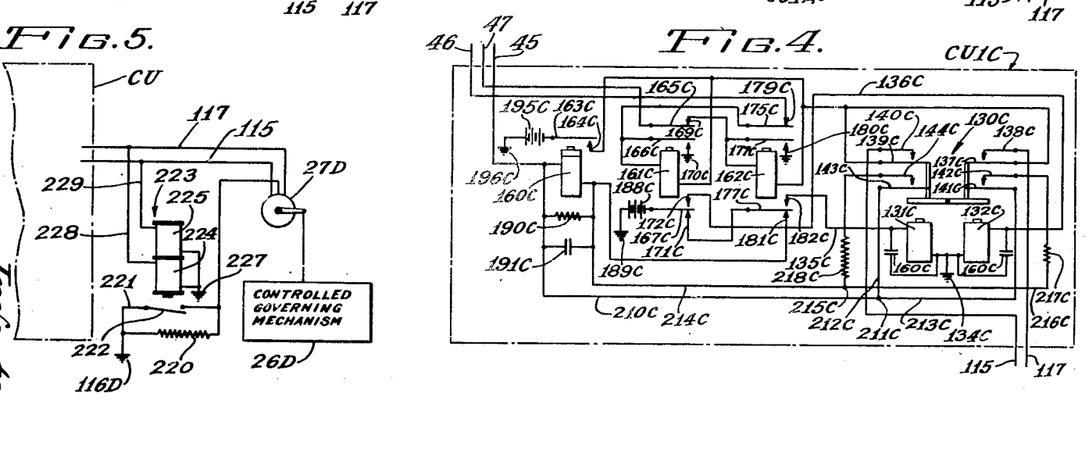
Fig. 4 is a wiring diagram illustrating another form of control unit embodying the invention and adapted to be used in the control apparatus of Fig. 1.
Fig. 5 is a fragmental wiring diagram illustrating means whereby the controlling action attained with the apparatus of Figs. 1, 2, 3 and 4 may be further refined.

In Fig. 4 of the drawings the invention has been illustrated as embodied in a control unit CU1C which is adapted to be used in a control apparatus such as that shown in Fig. 1, and in this control unit the master relay and the secondary relays are of the form utilized in the control unit CU1B and these relays are associated with a balanced relay 130C so that the control unit CU1C attains the same desirable operating characteristics as the control unit CU1A. Thus in the control unit CU1C master and secondary relays correspond in most respects to the relays of the control unit CU1B, and hence the same reference characters are employed with the suffix "C" added in each instance. The relays 161C and 162C, however, have but three movable contacts, the contacts 168, 173, 178 and 183 having been eliminated, and the function of these relay contacts in reducing the release time of the master relay has been transferred to the balanced relay 130C. Moreover, the relay contact 182C is, in this embodiment of the invention, connected by a wire 135C to one terminal of the relay coil 131C, so that when the relay 162C is operated, circuit is closed to the relay coil 131C so as to close the contacts 137C—138C and thereby extend circuit from the battery 195C to the speed adjusting unit through the wire 117. Similarly, the contact 172C is connected by a wire 136C to one terminal of the relay coil 132C, thus to cause the contacts 139C—140C to be closed when the relay 162C is operated. This closes a circuit to the speed adjusting unit through the wire 115. Thus the speed adjusting unit will operate in opposite directions in accordance with the manner in which the secondary relays 161C and 162C are operated. In this embodiment of the invention the two wires 210C and 214C from opposite terminals of the master relay 160C are extended to terminals 211C and 215C respectively, as in the embodiment of Fig. 3; and branch leads 212C and 213C are extended from the terminal 211C to the relay contacts 143C and 141C, respectively. A resistor 217C is connected, by means including a wire 216C, between the terminal 215C and the relay contact 142C, while a somewhat larger resistance 218C is connected between the terminal 215C and the relay contact 144C. Hence, when operation of the relay 130C in one direction or the other initiates operation of the speed adjusting means, a circuit through the resistance 217C or 218C is established which causes the release period of the master relay 160C to be reduced. The extent of such shortening of the release period of the master relay may be different in different directions of operation of the relay 130C, as by using different values for the resistors 217C and 218C.

The relay 130C in the control unit CU1C, as in control unit CU1A, may have a short sustained period of operation, as will be imparted thereto by condensers 160C of substantial capacity, and by such a sustained period of operation the speed adjusting operation, in some instances where the speed differential is high, may be continuous so as to correct the objectionable speed difference more quickly. Moreover, such an extended operating period for the relay 130C may be safely used because upon detection of reversal of the sense of rotation of the compared shafts, the other relay coil of the relay 130C is energized so as to cause prompt reversal of the relay 130C and prompt initiation of the desired speed correction in the opposite direction.

As hereinbefore pointed out, it is usually desirable, when the detected variance from the desired speed relationship between two shafts is unusually large, to re-establish the desired relationship as rapidly as possible, and in other embodiments of the invention, as for example, in those embodiments shown in Figs. 2 and 4, the speed adjusting mechanism is operated continuously when the speed differential is large, thereby to reduce the time necessary to re-establish the desired speed relationship. Under circumstances where such mechanism does not operate sufficiently fast, the means illustrated in Fig. 5 may be employed, and it will be observed that this means is there illustrated in association with a control unit CU which may constitute a control unit constructed in the same manner as any one of the control units CU1, CU1A, CU1B or CU1C. Thus, as shown in Fig. 5, the wires 115 and 117 are connected to the respective field winding of an actuating motor 27D which operates the controlled speed governing mechanism 26D, and the common terminal of such field windings is connected to ground at 116D through a resistor 220 which normally limits the voltage and current applied to the motor 27D to thereby normally govern the speed of the motor. A shunt circuit 221 including a normally open contact 222 is provided around the resistance 220 so that when the contact is closed, the resistance 220 will be shunted out of the motor circuit and the motor will therefore operate at a higher speed in accomplishing the desired speed adjusting operation. In accordance with this invention such closure of the contact 22 is automatically accomplished when the detected speed differential is large, and this is done by providing the contact 222 as a part of a relay 223 having similar actuating coils 224 and 225, either one of which will effect closure of the contact 222. Corresponding terminals of the relay coils 224 and 225 are grounded at 227, while the other terminals of the coils 224 and 225 are connected respectively by wires 228 and 229 to the wires 115 and 117. The relay coils 224 and 225 are of the slow-to-operate type, and are so arranged that when the control impulses passing through the wire 117 or 115 are relatively short, as would be in the event that the speed differential is relatively small, the relay 223 will not operate. When, however, the control impulses in the wire 115 or 117 become quite long, a condition which indicates a relatively high speed differential, the relay 223 operates and the contact 222 is closed so as to cause operation of the speed adjusting means at a higher speed. Thus, the speed adjustment will be accomplished more rapidly, and as the desired speed relationship is approached, the length of the control impulses in the wire 115 or the wire 117 will decrease and the relay 223 will release, thereby to cause the final speed adjustments to be made more slowly. Such operation of the control means of Fig. 5 thus insures prompt or rapid correction of larger speed differentials while enabling accurate correction of smaller speed differentials, and hence the performance characteristics of the control apparatus as a whole are improved.

Figure 6:
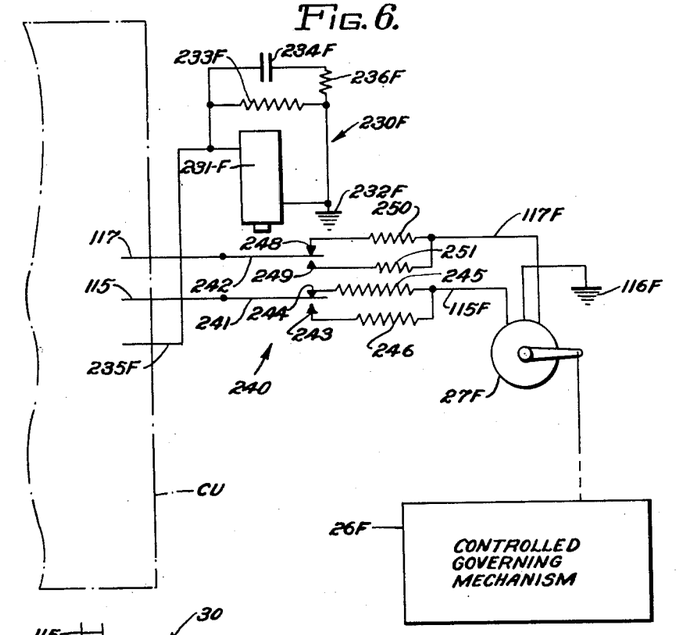
Fig. 6 is a fragmental wiring diagram showing a form of means for increasing the accuracy of control attained by the mechanism of Figs. 1 and 2, 3 and 4.

It has been mentioned hereinbefore that load conditions on a secondary shaft may render the driving means of such shaft more quickly responsive to reduction of speed than to increase of speed, and while compensation for such difference in responsiveness may in many instances be attained in the manner taught in connection with the embodiments shown in Figs. 1 to 4, the difference in such responsiveness may in some instances require an even more pronounced difference in the speed adjustments applied to the shaft driving means in opposite directions. Thus the adjusting motor, as 27, may be connected or arranged so as to operate faster in one direction than in the other, and in Fig. 6 of the drawings an embodiment of the invention is illustrated wherein such operation is attained. As shown in Fig. 6, the adjusting motor 27F has the common terminal of its field windings grounded at 116F, while the other terminals of the two windings are connected by wires 115F and 117F to speed controlling mechanism 240 which operatively associates the wires 115F and 117F with the wires 115 and 117 respectively of a control unit CU which may be of the kind shown in any one of Figs. 1 to 4. The speed controlling mechanism 240 includes a slow-to-release relay 230F having an actuating coil 231F grounded at one of its terminals at 232F. In the present instance the desired slow-to-release characteristics are imparted to the relay 230F by a condenser 234F connected across the terminals of the coil 231F, a resistance 233F being connected in parallel with the condenser 234F. The other terminal of the coil 231F has a wire 235F extended therefrom, and this wire is connected to the energizing circuit of the master relay in such a manner that the circuit to the relay coil 231F is broken when one of the secondary relays is operated. Thus, as to the embodiment of Fig. 1, the wire 235F is connected to the wire 96 so that when one of the secondary relays is operated, the opening of the relay contact 85 or 95 will break the circuit to the relay coil 231F. With this arrangement the relay coil 231 will be continuously energized so long as the speed relationship of the two compared shafts is within the desired range, so as to maintain the movable relay contacts in their upper positions. The relay 230F has two movable relay contacts 241 and 242 which are connected respectively to the wires 115 and 117. The contact 241 is arranged to operate between spaced contacts 243 and 244 which are connected in parallel to the wire 115F by resistances 245 and 246, while the contact 242 is arranged to operate between spaced contacts 248 and 249 which are connected in parallel to the wire 117F by resistances 250 and 251. The contact arrangement is such that when the relay coil 231F is energized, the contact 242 is engaged with the contact 248 and the contact 241 is engaged with the contact 244, and when the relay coil 231F is de-energized the contacts 241 and 242 are engaged respectively with the contacts 243 and 249.

It will be recalled that when the speed of the secondary shaft is to be increased, the circuit to the speed adjusting motor, as 27F, is completed through the wire 117, and hence the resistance 250 is made somewhat smaller than the resistance 245, thereby to cause the adjusting motor to operate faster when circuit is extended from the wire 117 than it does when circuit is extended from the wire 115. Similarly, the resistance 251 is somewhat smaller than the resistance 246, and in addition, the relationship among the resistances 245, 246, 250 and 251 is such that the resistance 250 is larger than the resistance 251 and the resistance 245 is larger than the resistance 246. Thus, when the relay 230F is fully energized, as it is when the speed differential is relatively small, the wires 115 and 117 will be connected to the motor 27F through the low speed resistances 245 and 250, respectively, and the motor 27F will operate at its lower speed in one direction or the other, as determined by the one of the wires 115 or 117 which is energized. If the motor 27F is energized for the period which extends beyond the time when the relay 230F is released, the engagement of the contacts 241 and 242 with the contacts 243 and 249 will throw the other resistances 246 and 251 into association with the wires 115 and 117 and the speed adjusting operation which is in progress will be completed at a higher speed as determined by the resistance 246 or 251 which is disposed in the energizing circuit of the motor 27F. In this connection it may be observed that the contacts of the relay 230F are of the make-before-break type so that operation of the motor 27F is not interrupted when a change is made from low to high speed operation. Hence when one of the secondary relays of the control unit operates so as to complete a control or energizing circuit to the motor 27F, the current flow through the motor will be governed by the resistance 245 or 250 so as to cause operation of the motor at slow speed. If the control or adjusting operation of the motor is relatively short, which of course indicates that the amount of variance of the relative speeds of the shafts is small, the relay coil 231F will remain energized throughout the entire adjustment period. When, however, the period of control or adjustment is relatively long, relay 230F will release so as to close the contacts 243 and 249 and thus cause the motor 27F to operate at higher speed for the remainder of the control period. In attaining such action the release period of the relay 230F is, of course, set at a value which is related to the release time of the master relay of the control unit, such value being substantially less than the maximum release time which the master relay may have during a control operation. Thus, when the control operation of the motor 27F continues after release of the master relay of the control unit, that portion of the operating period of the motor 27F will be at high speed. This desirable operation arises because of the large variance in the relative speed of the two compared shafts, and the operation under such circumstances is further improved by providing a resistance 236F in series with the condenser 234F. This resistance restricts the rate at which the condenser 234F may be charged, and hence when the detected speed differential is high, and the time between control impulses to the motor 27F is short, the condenser 234F will be charged in a correspondingly less amount. Hence the release time of the relay 230F will be reduced under such circumstances and the adjusting motor 27F will be operated at high speed for a correspondingly larger proportion of the control period. Thus, the corrective action of the motor 27F is more rapid and effective when the speed differential is high, and yet, when the speed differential has been reduced to substantially the desired relationship, the adjusting motor operates at its low speed so as to reduce the possibilities of overcorrection.

As a further aid in attaining rapid correction of unusally large variations in the differential speed of the two compared shafts, the relay 230F may be constructed so as to possess slight slow-to-operate characteristics, for by this means the opening of the contacts may be so delayed that when the energizing periods for the relay are relatively short, as when such a high speed differential exists, the contacts will remain closed, and the entire period of adjusting operation of the motor 27F will therefore be at high speed. In addition it will be observed that in the form shown in Fig. 6, the speed of corrective adjustment is not only varied in accordance with the magnitude of the speed variance which is to be corrected, but is also varied in accordance with the sense of the correction which is to be made.

Figure 7:
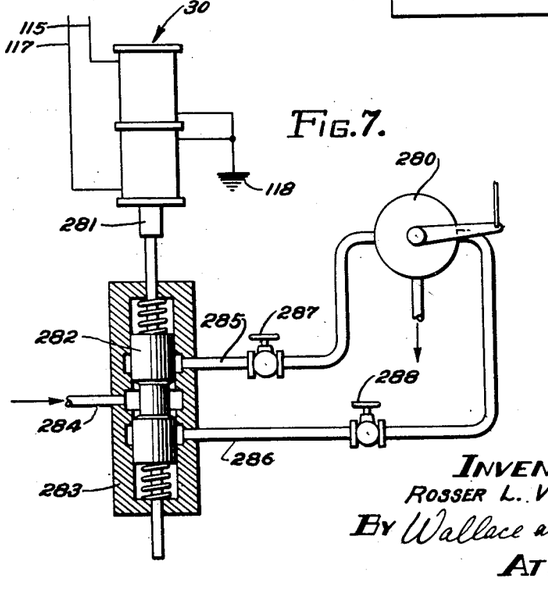
Fig. 7 is a diagrammatic view illustrating another form of actuator which may be utilized.

In Fig. 7 of the drawings there is illustrated an embodiment of hydraulic actuator which may be associated with the two-way solenoid 30 illustrated in Fig. 1A of the drawings, and this hydraulic actuator is adapted to be associated with mechanism such as that shown in Fig. 1, in which instance a hydraulic motor 280 which forms a part of this hydraulic actuating mechanism would be substituted for motor 27 of Fig. 1. The two-way solenoid 30 has two operating coils which act in opposite directions upon an armature 281, and this armature is operatively connected to a balanced valve 282 which normally assumes a centered position within a valve casing 283. Hydraulic fluid under pressure is supplied to the valve casing through an inlet 284 and it is adapted to be passed from the valve casing 283 selectively through outlet passages 285 and 286. The outlet passage 285 is connected to the hydraulic motor 280 so as to operate the motor in one direction, while the outlet passage 286 is connected to motor 280 to operate the same in the other direction. The two passages 285 and 286 have valves 287 and 288 respectively positioned therein so that the rate of flow to the motor 280 through these passages may be regulated. Thus by adjustment of the valves 287 and 288 the speed of operation of the motor 280 may be varied, and by such means the adjustment of the speed varying means, such as the controlled governing mechanism 26 of Fig. 1, may be attained at a faster rate when the speed of the engine is to be increased.

Figure 8:
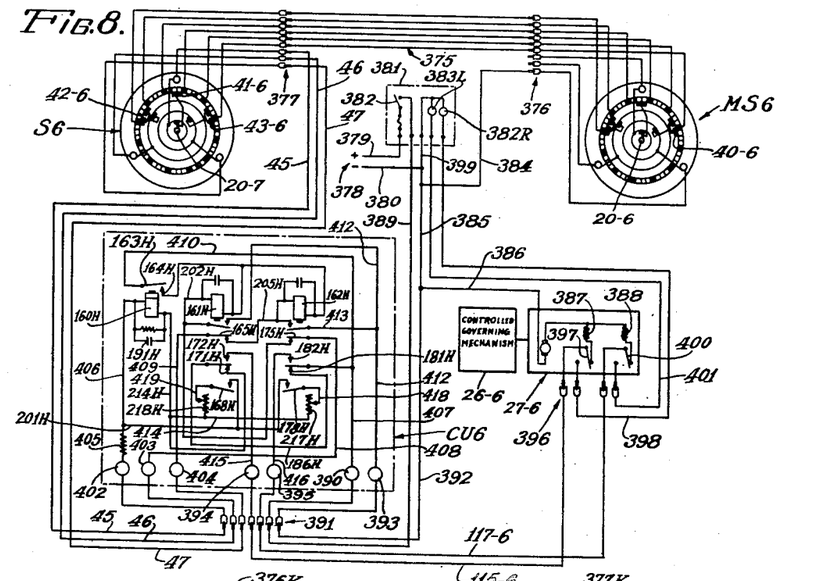
Figs. 8 and 9 are schematic wiring diagrams illustrating further embodiments of the invention.

In Fig. 8 of the drawings there is illustrated an embodiment of the invention whereby one of the engines of a two-motored airplane may serve as a master engine and the speed of the other engine may be correlated with the master engine within relatively close limits. In this embodiment of the invention a master commutator switch MS6 and a secondary commutator switch S6 are employed and these switches may be of an identical construction. The master switch MS6 is arranged so that the brush elements thereof are driven by a master shaft 20—6 while the brush elements of the secondary commutator switch S6 are driven by a secondary shaft 20—7, these shafts constituting driven elements of the master engine and the secondary respectively of the airplane. The secondary commutator switch has brushes 41—6, 42—6 and 43—6 which correspond to the brushes included in the secondary commutator, as S1, of Fig. 1. Similarly arranged brushes are included in the master switch MS—6, but since this switch is to act as the master, only one of these brushes is utilized and this brush is identified as 40—6 since it corresponds in function with the brush 40 of the embodiment of the invention shown in Fig. 1.

The commutator bars of the switches MS6 and S6 are so arranged that diametrically opposite commutator bars in each switch are electrically connected, and correspondingly located commutator bars of the two switches are electrically connected by wires indicated generally at 375, there being connector plugs 376 and 377 interposed in the connecting wires 375 to facilitate installation of the apparatus.

The two commutator switches are associated with a control unit CU6 which is in many respects similar to the control unit CU1B shown in Fig. 3 of the drawings, and through this control unit, the operation of an adjusting motor 27—6 is controlled so that a controlled governing mechanism such as the speed varying mechanism 26—6 may be operated in opposite directions. The speed governing mechanism may be arranged to adjust the fuel supply and hence govern the speed of a variable speed engine which drives the secondary shaft 20—7. In the present instance the motor 27—6 is energized from a suitable source of current indicated at 378 and affording line wires 379 and 380, and these line wires are connected to the various elements of the apparatus through a control panel 381 which affords a manual control switch 382 through which the mechanism may be rendered operative or inoperative. The control panel 381 also includes signal lamps 383L and 382R which are lighted selectively, as will hereinafter be explained, to indicate that the adjusting motor 27—6 has reached the limit of its travel in one direction or the other.

One side of the circuit is extended from the line wire 380 to the brush 40—6 of the master switch by means including a wire 384, this wire being extended through the plug socket 376. This same side of the circuit is extended by wires 385 and 386 to the common terminal of the field windings 387 and 388 of the adjusting motor 27—6. The other side of the source 378 is extended from the wire 379 through the switch 382 and a wire 389 to a terminal 390 of the control unit CU6, this connection being through a connector plug 391 to facilitate installation of the apparatus. Circuit is extended from the line wire 380 through the wire 385 and a wire 392 to another terminal 393 in the control unit CU6, and as will be hereinafter explained in detail, the control circuits from the control unit CU6 to the field windings of the motor 27—6 are arranged to include terminals 394 and 395 which form part of the control unit CU6. Thus, wires 116—6 and 117—6 are extended from the terminals 394 and 395 through the connector plug 391 to the field windings 387 and 388 respectively, such wires being extended through a connector plug 396 at the motor 27—6. The wire 116—6 is connected to the field winding 387 through a limit switch 397 which, when opened by operation of the motor to one limit of its travel, is arranged to engage another contact which extends circuit through a wire 398 to the signal lamp 382R, and circuit from this lamp is continued to the line wire 380 by a wire 399. A similar limit switch 400 is interposed between the wire 117—6 and the field winding 388, and when this switch opens the circuit to the field winding, it is arranged to engage another contact which extends the circuit through a wire 401 to the signal lamp 383L. Thus when the motor reaches one limit of its travel, this condition is indicated by the lighting of the appropriate one of the two signal lamps, and the pilot may then readjust the manual control in the manner explained with reference to Fig. 8 of my aforesaid parent application, thereby to enable the control apparatus to continue its automatic operation.

As hereinbefore pointed out, the switch S6 constitutes the secondary switch of the apparatus shown in Fig. 8, and wires 45, 46, and 47 are extended from the three brushes of this commutator switch in the same manner as in the embodiment of the invention shown in Fig. 1 of the drawings. These wires are extended through the connector plugs 377 and 391, and in the control unit CU6, the wire 45 is connected to a terminal 402, the wire 46 is connected to a terminal 403, and the wire 47 is connected to a terminal 404.

The control unit CU6, being similar to the control unit CU1B, has a master relay 160H and two secondary relays 161H and 162H, and these relays are connected and related to each other in substantially the same manner as the three relays of Fig. 3. Thus, in general, it should be observed that circuits extended from the line wire 389 through the switch MS6 and the switch S6 to the wires 45, 46 or 47, must be extended through the relay to be operated and back to the line wire 382 through the manual switch 379. As to the master relay 160H, such a circuit is extended from the terminal 402 through a protective resistor 405 and a wire 406 in series to one terminal of the coil of the master relay 160H, while means including a wire 214H connects the other side of the relay 160H through the relay contacts 171H and 181H, in series, and thence through a wire 407 to the terminal 390. The relay 160H has means including a condenser 191H connected across its terminals to impart predetermined slow-to-release characteristics thereto. The energizing circuit for the relay 161H is extended from the terminal 403 by a wire 408 to a normally closed relay contact 175H of the relay 162H, from which a wire 202H extends circuit to one side of the relay coil. Similarly, the energizing circuit for the relay 162H includes a wire 409 from the terminal 404 to the normally closed relay contact 165H, from which a wire 205H extends to one side of the relay 162H. Wires from the other two terminals of the relays 161H and 162H are connected to the relay contact 164H, while a wire 410 extends from the contact 163H to the wire 407 to thus carry the circuit back to the terminal 390. Holding circuits for the relays 161H and 162H are provided by a wire 411 and branch leads 412 and 413 to normally open contacts of the respective relays 161H and 162H, so that these holding circuits extend through and are controlled by the master relay contacts 163H and 164H. These holding circuits are effective, so long as the relay contacts 163H and 164H are closed, to hold the actuated one of the secondary relays in its actuated condition after the circuit through the wire 46 or 47 has been broken.

In the embodiment of the invention shown in Fig. 8, a relatively long normal release time for the master relay 160H is employed, such as two or three seconds, to thereby attain sensitivity of detection of undesired speed variation between the two shafts, and means are provided for reducing the normal release time of the master relay whenever one of the secondary relays is operated. This is accomplished by connecting electrical resistance across the terminals of the master relay coil. Thus, a wire 201H, connected to the wire 406, has branch leads extended to the stationary contacts of normally open relay contacts 168H and 178H, and these contacts 168H and 178H are connected through adjustable or variable resistances 218H and 217H, respectively, to a wire 414 which extends to the wire 214H. Thus when the relay 161H is energized, the contact 168H is closed and the resistance 218H is connected across the terminals of the master relay 160H, while operation of the relay 162H similarly connects the resistance 217H across the master relay.

When the relay 161H is thus energized, a contact 172H is closed, this contact being connected by a wire 415 to the terminal 394, and therefore circuit is extended from the contact 172H through the winding 387 of the adjusting motor 27—6 and to one side of the power source at 380. The movable relay contact which thus engages the contact 172H is connected by a wire 186H to the contact 181H and thence through the wire 407 to the terminal 390, thereby to complete circuit through the wire 389 and the switch 382 back to the other side of the line. The circuit for the other field winding of the motor 27—6 is completed by closure of the relay contact 182H when the relay 162H is energized, the relay contact 182H being connected to the terminal 395 by a wire 416 and the movable contact which engages the contact 182H being connected to the wire 407.

Thus, the operation of the adjusting motor 27—6 is initiated in the appropriate direction by selective closure of the secondary relays 161H or 162H, and the operation of the motor is continued until release of the master relay 160H breaks the holding circuit to the effective one of the secondary relays. Such periods of operation of the motor are so controlled, however, by the resistance 217H or 218H that objectionable over-correction is avoided despite the relatively protracted normal release period of the master relay 160H. In the embodiment of the invention shown in Fig. 8, the provision for adjustability of the resistance 217H, as by an adjusting member 418, and for adjustment of the resistance 218H, as by an adjusting member 419, enables such control of the operation of the apparatus to be quickly and easily attained with respect to a particular installation. Thus the normal release period of the master relay 160H may be established at an arbitrary and relatively large value in order that sensitivity of detection may be assured, and after installation of the apparatus, the apparatus may be adjusted by the adjustable devices 418 and 419 so as to attain the desired correlation without over-correction or hunting. As an example, it may be found, upon initial operation of a newly installed control apparatus, that the length of the operating period of the adjusting motor and the speed at which the motor operates the governing mechanism will cause over-correction where the detected speed differential is slight, and when such operation is noted, corrective adjustment may be made upon the resistances 217H and 218H so as to decrease the amount of resistance which is thrown across the terminals of the master relay. Such reduction in the effectiveness of these resistances enables more rapid dissipation of the charge in the condenser 191H and this results in reducing or shortening the normal release time, and hence the apparatus may be readily set so as to attain the desired correlation without over-correction. It will be observed, of course, that the amount of resistance thus thrown across the terminals of the relay should be kept as large as is consistent with elimination of over-correction, for by so doing the time required to correct large speed differences will be minimized.

Figure 9:
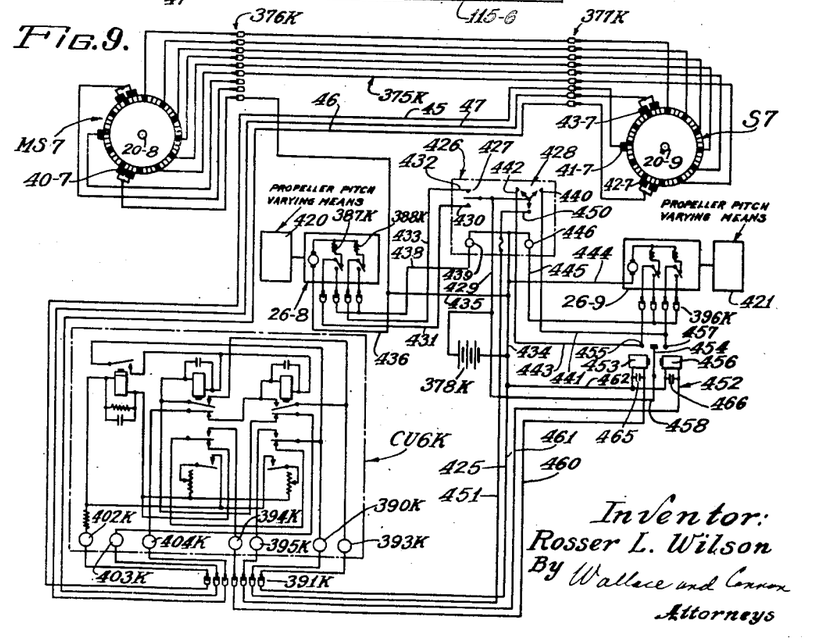

In Fig. 9 of the drawings there is illustrated another embodiment of the invention whereby correlation of the two engines of a two motored airplane may be attained in such a manner that one of the engines serves as a master with which the speed of the other or secondary engine is correlated. This embodiment of the invention is adapted particularly for use where the speed correlation and adjustment is attained through the use of variable pitch propellers, although in most of its aspects, this embodiment of the invention might be used with equal effectiveness for adjusting the fuel supply of the engines so as to control and correlate the engine speeds. Thus, the master engine has a master shaft 20—8 the speed of which may be adjusted by a propeller pitch varying means 420 associated with the propeller of the master engine and driven by a reversible motor 26—8 of the construction shown in Fig. 8. Similarly, the secondary engine has a secondary shaft 20—9 which may be controlled and adjusted as to speed by a propeller pitch varying means 421 associated with the propeller of the secondary engine and driven by a motor 26—9 of the construction shown in Fig. 8.

The master shaft 20—8 and the secondary shaft 20—9 have commutator switches MS7 and S7 respectively associated therewith, such switches both being of the same construction as the switch are driven by their respective shafts 20—8 and 20—9. In the secondary switch S7 the three brushes have been identified as 41—7, 42—7 and 43—7 so as to conform with the identification used in Fig. 8; and similarly the one brush of the master commutator switch MS7 which is utilized is identified as 40—7. The other two brushes of the master switch MS7 are left in position. The same condition of course applies to the embodiment of Fig. 8.

The commutator bars of the two switches MS7 and S7 are connected by means including wires 375K and connector plugs 376K and 377K in the general manner disclosed in Fig. 8, it being noted, however, that the connections within the switches MS7 and S7 include slip ring arrangements as shown in Figs. 10 to 12 of my aforesaid parent application. Similarly, the three brushes of the secondary switch S7 are connected through the plug 377K and wires 45, 46 and 47 to a control unit CU6K of the construction shown in Fig. 8.

This control unit has corresponding terminals, and the wires 45, 46 and 47 are connected through the plug 391K to the terminals 402K, 403K and 404K, respectively.

In the embodiment shown in Fig. 9 the circuit is energized from a power source such as a battery 378K which has one side thereof connected by wire 425 to the terminal 393K of the control unit CU6K. The other side of the battery 378K is associated with the mechanism through a switch panel 426 which includes a two-way switch 427 and a three-way switch 428. Thus the other side of the battery 378K has a wire 429 extended therefrom with branch leads to the common terminals of the two switches 427 and 428. The switch 427 has one stationary contact 430 connected by a wire 431 to the field winding 387K of the motor 26—8, while the other contact 432 of the switch 427 is connected by a wire 433 to the field winding 388K of the motor 26—8. A wire 434 is extended from the wire 425 and in series through wires 435 and 436 to the common terminal of the two field windings of the motor 26—8, and hence by manual closure of the switch 427 selectively to the contact 430 or the contact 432, the motor 26—8 may be operated in either direction selectively to produce the desired adjustment of the propeller of the master engine. This will, of course, vary the speed of the master engine and its shaft 20—8. The motor 26—8 has limit switches through which the wires 431 and 433 are connected in the same general manner as in the embodiment shown in Fig. 8, and when either of these limit switches is opened, a warning circuit is extended through a wire 438 to a signal lamp 439 which is connected at its other side to the wire 434.

Generally similar manually controlled connections are provided for the motor 26—9, there being a contact 440 in the switch 428 which is connected by a wire 441 to one side of one of the field windings of the motor 26—9 through its associated limit switch. The switch 428 also has a contact 442 which is connected by a wire 443 to one end of the other field winding of the motor 26—9 through the related limit switch, and the common terminal of the motor 26—9 is connected by a wire 444 to the wire 434. When either one of the limit switches of the motor 26—9 is opened, a circuit is closed through means including a wire 445 through a signal lamp 446 and back to the wire 434. Thus by closure of the switch 428 to one of the contacts 441 or 442, the adjusting motor 26—9 may be operated in either direction to adjust the pitch of the propeller of the secondary engine, thereby to cause the speed of the secondary engine to be varied.

When the control apparatus of the present invention is to be rendered operative, the switch 428 is closed to a contact 450 which is connected through a wire 451 to the terminal 390K of the control unit CU6K. When this is done the relays of the control unit are rendered operative, and circuit may be extended thereby to the terminal 394K or 395K selectively. When circuit is thus extended to one of these two control terminals, this embodiment of the invention is arranged to control circuit to the windings of the motor 26—9 selectively, and in accomplishing this result, a two-way or balanced relay 452 is utilized. This relay 452 has an actuating coil 453 which is operable to move the contact 454 of the relay into engagement with the contact 455 which is provided in the wire 443, and a similar coil 456 is provided in the relay 452 which is operable to draw the contact 454 into engagement with a contact 457 which is connected to the wire 441. The contact 454 of the relay 452 is connected by a wire 458 to the wire 429 so that when the contact 454 is engaged with one or the other of the contacts 455 and 457, circuit is completed to one or the other of the field windings of the motor 26—9. The relay coils 453 and 456 are controlled by the control unit CU6K, the terminal 394K of the control unit being connected by a wire 460 to one terminal of the relay coil 453, while the terminal 395K is connected by a wire 461 to one terminal of the relay coil 456. The other terminals of these two relay coils are connected by means including a wire 462 to the wire 425. Hence when circuit is extended to the terminal 394K, the relay coil 453 is energized so as to cause circuit through the contact 455 to one of the field windings of the motor 26—9, while completion of a circuit to the terminal 395K energizes the relay coil 456 and causes circuit to be completed through the contact 457 to the other field winding of the motor 26—9. Condensers 465 and 466 are connected across the terminals of the relay coils 453 and 456 to thereby impart slow-to-release characteristics thereto and obtain the resulting advantages described in connection with the relay 130 of Fig. 2. Thus the control mechanism of the Fig. 9 operates to adjust the speed of the secondary shaft 20—9 to conform the speed of the master shaft 20—8. The speed of the master shaft 20—8 may of course be varied from time to time by manipulation of the manual control switch 426, and in such an event the control apparatus operates to adjust the speed of the secondary shaft 20—9 to conform with the newly established speed of the master shaft.

It will be observed that in the embodiment of the invention shown in Figs. 1 to 4 of the drawings, the values of the resistances which control the reduction of the release time of the master relay have been shown as having fixed values, and in high production manufacture of the control apparatus for use with equipment of a particular design, such fixed values for such resistors serve to attain the desired functioning of the control apparatus so as to cause proper speed correlation. However, where varying conditions of use or possible variations in the operating characteristics of the equipment are possible or expected, these controlling resistances may be made variable or adjustable as taught in connection with the embodiments of the invention disclosed in Figs. 8 and 9. Such variable or adjustable characteristics may, of course, be utilized even though the resistances are to be of different values in respect to opposite directions of operation of the speed adjusting means. Thus in any event, whether these control resistances are of fixed value or are adjustable in character, their controlling action in governing the characteristics of the control impulses to the speed governing means enables the control apparatus to be used with any particular speed adjusting means without change or modification of the speed adjusting means.

In view of the foregoing description it will be apparent that the present invention enables control apparatus for correlating or controlling the speed of one or more shafts or the like to be readily adapted to the equipment with which it is to be used, and hence, without redesign or modification of such equipment, the control apparatus of this invention will function to attain the desired speed correlation or control. Moreover, it will be apparent that with the control apparatus of the present invention, the desired accuracy of speed correlation or control may be attained under the varying circumstances which involve variations in the nature or type of the associated equipment or where varying conditions are encountered in use. Furthermore, the ability of the present control apparatus to variably control and variably adjust the speed of one or more engines or the like is of particular utility in aviation uses, for through the functioning of the present apparatus the operation and control of an airplane is materially simplified whether the airplane be of the single motor type or the multimotor type. Thus, in a single motored airplane, the maintenance of the engine speed at a predetermined standard established independently of the load avoids the necessity for manual control and readjustment of engine speed during rapid changes of flight attitude which would otherwise tend to violently race the engine of the airplane. In airplanes having two or more engines the control apparatus has this same beneficial effect where an electric motor or the like is used as the speed standard; and in such airplanes, whether the speed standard is set by an independent electric motor or by one of the engines, the control apparatus serves to afford a single manual control for the plurality of engines, thereby to simplify the operation of the airplane. The maintenance of synchronism of the several engines of the airplane also has other beneficial results, for it reduces deviation from the desired course which might result from unbalanced application of driving power, and is helpful under conditions where formation of ice on one or more propellers would otherwise reduce engine speed or cause lack of synchronism of the engines.

It will also be evident that the control apparatus of the present invention is of such a character that many difficult and widly varying problems of synchronization or speed control may be handled thereby, for the present control apparatus not only is readily adaptable to the varying types of speed adjusting means which may be encountered but is also of such a character that it compensates for differences in the response of the controlled apparatus due to load or the like. Moreover, the speed adjustments attained with the present apparatus are directly related to the magnitude of the speed differential which is to be corrected, and this is accomplished despite the fact that the detecting means of the control apparatus is sensitive to extremely small speed variations.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. In a control apparatus for correlating the rotative speeds of relatively rotatable elements such as independently driven shafts, a master shaft and variable speed driving means therefor, an independently rotatable secondary shaft, a variable speed engine for driving said secondary shaft, means operable in two directions for varying the speed of said engine to selectively increase or decrease the speed thereof, means operatively associated with said shafts and operable to detect undesired variation in the speed relationship of said shafts and to determine the sense of such variation, and means controlled by said detecting means in response to any selected magnitude of speed variance that is detected to actuate said speed varying means in one amount and in a corrective direction when the detected speed of said secondary shaft is greater than the desired speed and in a greater amount and in the opposite corrective direction when the detected speed of said secondary shaft is less than the desired speed.

2. In a control apparatus for correlating the rotative speeds of relatively rotatable elements such as independently driven shafts, a master shaft and variable speed driving means therefor, an independently rotatable secondary shaft, a variable speed engine for driving said secondary shaft, means operable in two directions for varying the speed of said engine to selectively increase or decrease the speed thereof, means operatively associated with said shafts and operable to detect undesired variation in the speed relationship of said shafts and to determine the sense of such variation, and means controlled by said detecting means in response to any particular magnitude of speed variance that is detected to actuate said speed varying means for an operating period of one length and in a corrective direction when the detected speed of said secondary shaft is greater than the desired speed and in the opposite corrective direction and for an operating period of greater length when the detected speed of said secondary shaft is less than the desired speed.

3. In a control apparatus for correlating the rotative speeds of relatively rotatable elements such as independently driven shafts, a master shaft and variable speed driving means therefor, an independently rotatable secondary shaft, a variable speed engine for driving said secondary shaft, means operable in two directions for varying the speed of said engine to selectively increase or decrease the speed thereof, means operatively associated with said shafts and operative to detect undesired variation in the speed relationship of said shafts and to determine the sense of such variation, and means controlled by said detecting means in response to any particular magnitude of speed variance that is detected to actuate said speed varying means selectively in opposite directions and at one speed when the detected speed of said secondary shaft is greater than the desired speed and at a greater speed when the detected speed of said secondary shaft is less than the desired speed.

4. In a control apparatus for correlating the rotative speeds of relatively rotatable elements such as independently driven shafts, a master shaft and variable speed driving means therefor, an independently rotatable secondary shaft, a variable speed engine for driving said secondary shaft, means operable in two directions for varying the speed of said engine to selectively increase or decrease the speed thereof, means operatively associated with said shafts and operable to detect the presence and the sense and magnitude of undesired variation in the speed relationship of said shafts, and means controlled by said detecting means in response to any particular magnitude of speed variance that is detected to actuate said speed varying means through corrective adjustments in different amounts such that a corrective ajustment to increase the speed of said secondary shaft is of greater magnitude than a corrective adjustment to decrease the speed of said secondary shaft.

ROSSER L. WILSON.